US009215595B2

(12) United States Patent
Okusu et al.

(10) Patent No.: US 9,215,595 B2
(45) Date of Patent: Dec. 15, 2015

(54) DATA SECURITY APPARATUS AND SYSTEM FOR MOBILE TERMINAL

(71) Applicant: FUJIFILM Corporation, Tokyo (JP)

(72) Inventors: Kiyohisa Okusu, Tokyo (JP); Satoshi Ueda, Tokyo (JP); Yuya Kudo, Tokyo (JP); Hironori Matsumasa, Tokyo (JP); Yasunori Ohta, Ashigarakami-gun (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 14/212,951

(22) Filed: Mar. 14, 2014

(65) Prior Publication Data
US 2014/0287718 A1 Sep. 25, 2014

(30) Foreign Application Priority Data

Mar. 22, 2013 (JP) .................................. 2013-060797

(51) Int. Cl.
H04M 1/66 (2006.01)
H04M 1/68 (2006.01)
(Continued)

(52) U.S. Cl.
CPC .............. *H04W 12/08* (2013.01); *G06F 21/71* (2013.01); *H04L 63/107* (2013.01); *H04L 63/108* (2013.01); *H04W 4/021* (2013.01); *G06F 2221/2101* (2013.01);
(Continued)

(58) Field of Classification Search
CPC ..... H04L 63/107; H04L 63/108; H04L 67/18; H04L 63/0492; H04W 4/02; H04W 12/08; H04W 4/021; G06F 21/71; G06F 2221/2111; G06F 2221/2143; G06F 2221/2101; G06F 2221/2113
See application file for complete search history.

(56) References Cited

U.S. PATENT DOCUMENTS

2002/0111139 A1   8/2002   Nishiyama et al.
2009/0208076 A1   8/2009   Nakajima et al.
(Continued)

FOREIGN PATENT DOCUMENTS

EP   1 860 863 A1   11/2007
JP   2007-259958 A   10/2007
(Continued)

OTHER PUBLICATIONS

European Search Report dated Jun. 10, 2014.
(Continued)

Primary Examiner — Ajit Patel
(74) Attorney, Agent, or Firm — McGinn IP Law Group, PLLC

(57) ABSTRACT

In an information sharing system, a data security apparatus includes a location acquisition device for acquiring GPS location information of a current location of a mobile terminal apparatus. A location evaluator checks whether the mobile terminal apparatus is located within a zone area according to the location information. A storage device stores association information of a relationship between the zone area and medical data of a medical chart allowed to be read within the zone area by authorization. A cancellation signal generator generates a cancellation signal for instructing cancellation of the medical data in case the location evaluator judges that the mobile terminal apparatus is moved out of the zone area. Furthermore, a data distributer transmits the medical data to the mobile terminal apparatus. In case the location evaluator judges that the mobile terminal apparatus has entered the zone area, the data distributer starts transmitting the medical data.

10 Claims, 7 Drawing Sheets

(51) Int. Cl.
*H04M 3/16* (2006.01)
*H04W 12/08* (2009.01)
*G06F 21/71* (2013.01)
*H04W 4/02* (2009.01)
*H04L 29/06* (2006.01)

(52) U.S. Cl.
CPC ............... *G06F 2221/2111* (2013.01); *G06F 2221/2113* (2013.01); *G06F 2221/2143* (2013.01); *H04L 63/0492* (2013.01)

(56) References Cited

U.S. PATENT DOCUMENTS

2013/0047197 A1* 2/2013 Saroiu et al. ............... 726/1
2013/0091564 A1* 4/2013 Fitzgerald et al. ............... 726/17
2013/0145438 A1* 6/2013 Choi et al. ............... 726/4

FOREIGN PATENT DOCUMENTS

| JP | 2008-219375 A | 9/2008 |
| JP | 2008-538250 A | 10/2008 |
| JP | 2009-189541 A | 8/2009 |
| JP | 2012-178096 A | 9/2012 |
| JP | 2012-248027 A | 12/2012 |
| WO | WO 2013/022002 A1 | 2/2013 |

OTHER PUBLICATIONS

Japanese Office Action dated Feb. 25, 2015 with an English translation thereof.

* cited by examiner

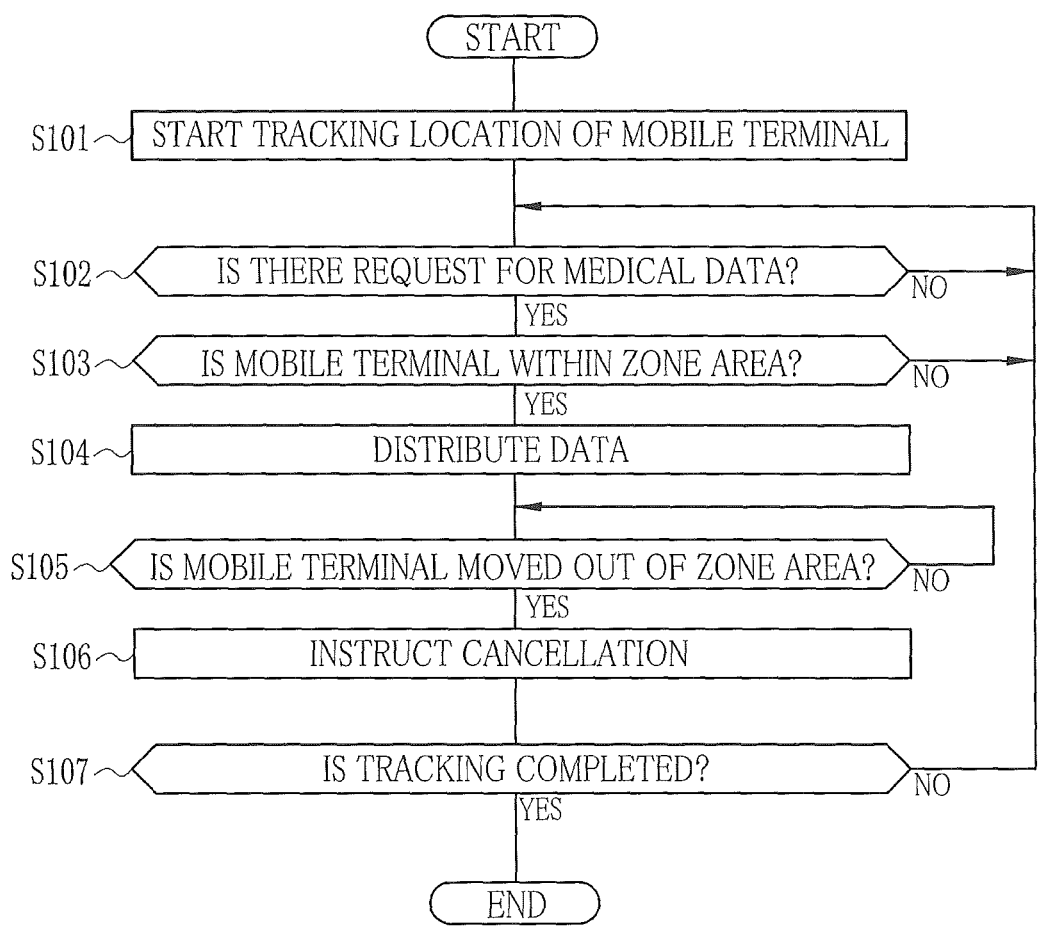

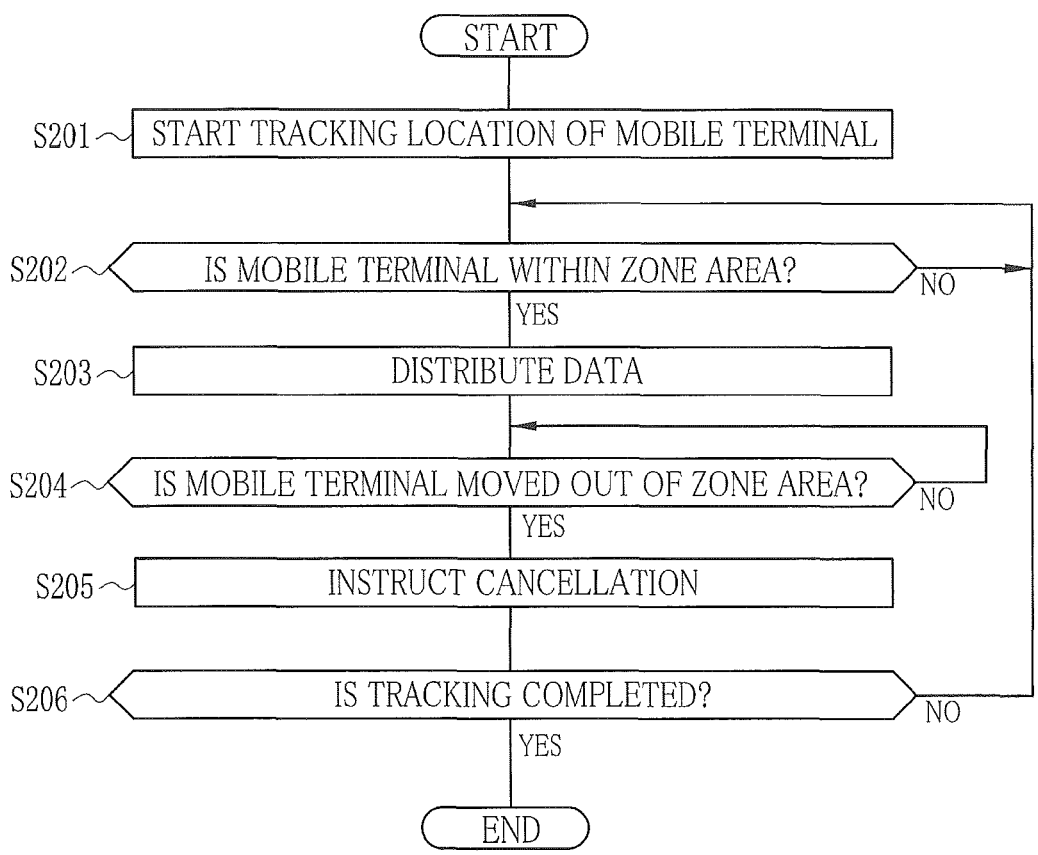

DATA SECURITY APPARATUS AND SYSTEM FOR MOBILE TERMINAL

BACKGROUND OF THE INVENTION

1. Field of the Invention

The present invention relates to a data security apparatus and system for a mobile terminal. More particularly, the present invention relates to a data security apparatus and system in which data can be read on a mobile terminal even with high confidentiality and information leakage can be prevented reliably.

2. Description Related to the Prior Art

U.S. Pat. Pub. No. 2009/208,076 (corresponding to JP-A 2009-189541) discloses an information sharing system including a server apparatus and a mobile terminal apparatus. The server apparatus stores medical data, such as clinical information of a patient, diagnostic data and the like. The mobile terminal apparatus accesses the server apparatus through a communication network, for a user to read the medical data on the mobile terminal apparatus. Even in case he or she is present outside a hospital facility as medical service provider, the medical data can be accessed and read easily.

The medical data includes information related to privacy of a patient with high confidentiality. The information sharing system must be established by considering prevention of information leakage. JP-A 2007-259958 discloses a nurse call system to prevent the information leakage of the medical data. The nurse call system is installed in a hospital facility, and informs medical staff such as nurse or doctor of a nurse call or patient call of the patient present in a hospital room.

JP-A 2007-259958 discloses the nurse call system, in which an information display panel is installed in a corridor of a hospital facility at one of hospital rooms and displays the clinical information of a patient. In case the nurse call is created, the information display panel is driven to display the clinical information of the patient as a caller. There is security control of the information display panel for preventing the information leakage. Only in case a wireless transmitter is carried by the patient and the medical staff and comes near to the information display panel, the clinical information is displayed. In case the wireless transmitter is distant from the information display panel, the clinical information does not appear but is kept invisible. Only in case the patient or the medical staff is present near to the information display panel, the clinical information is displayed. Thus, the clinical information can be protected from leakage to a third party.

The medical staff such as a nurse or doctor sometimes travels to visit a home of the patient outside the hospital facility for the purpose of a home care for diagnosis, treatment or nursing. The information sharing system disclosed in U.S. Pat. Pub. No. 2009/208,076 may be useful by use of the medical data such as the clinical information of a patient accessed with the mobile terminal apparatus. However, confidentiality of the medical data is very high. Prevention of the information leakage must be ensured. Should the mobile terminal apparatus be lost, a problem of the information leakage will be considerably serious. To this end, data management of the medical data should be carried out strictly in the use of the mobile terminal apparatus.

The nurse call system of JP-A 2007-259958 is installed in the site of the hospital facility, and cannot be utilized for the home care for diagnosis, treatment or nursing outside the hospital facility. The mobile terminal apparatus is used as the wireless transmitter. Reading the medical data on the mobile terminal apparatus is not suggested. In U.S. Pat. Pub. No. 2009/208,076, reading the medical data on the mobile terminal apparatus is suggested. However, the document is silent on prevention of the information leakage.

SUMMARY OF THE INVENTION

In view of the foregoing problems, an object of the present invention is to provide a data security apparatus and system in which data can be read on a mobile terminal even with high confidentiality and information leakage can be prevented reliably.

In order to achieve the above and other objects and advantages of this invention, a data security apparatus includes a location acquisition device for acquiring location information of a current location of a mobile terminal apparatus. A location evaluator checks whether the mobile terminal apparatus is located within a predetermined zone area according to the location information. A storage access device acquires association information of a relationship between the zone area and available data allowed to be read within the zone area by authorization, from a storage device. A cancellation signal generator generates a cancellation signal for instructing cancellation of the available data associated with the zone area in case the location evaluator judges that the mobile terminal apparatus is moved out of the zone area.

Preferably, furthermore, a data distributer transmits the available data to the mobile terminal apparatus. A data manager enables transmission of the data distributer in case the location evaluator detects that the mobile terminal apparatus is located within the zone area, and disables transmission of the data distributer in case the location evaluator detects that the mobile terminal apparatus is located outside the zone area.

Preferably, in case the location evaluator judges that the mobile terminal apparatus has entered the zone area, the data distributer starts transmitting the available data.

Preferably, furthermore, a data uploader uploads the available data upon a request from the mobile terminal apparatus in case the available data is updated in the mobile terminal apparatus.

Preferably, furthermore, an information registration device acquires schedule information of a planned travel of a user with the mobile terminal apparatus, and registers the association information according to the schedule information.

Preferably, the schedule information includes data of the zone area and data of a scheduled time period of a scheduled visit of the user associated with the zone area. Upon passage of the scheduled time period, the cancellation signal generator generates the cancellation signal for the available data corresponding to the zone area.

Preferably, the zone area is defined with reference to a predetermined destination location of a travel of a user carrying the mobile terminal apparatus.

Preferably, the location information is GPS information.

Preferably, the available data is medical data.

Preferably, the medical data is data of a medical chart.

In another preferred embodiment, a data security system is provided, and includes a mobile terminal apparatus, and a server apparatus, connected with the mobile terminal apparatus by communication network connection, for transmitting available data to the mobile terminal apparatus. A location acquisition device acquires location information of a current location of the mobile terminal apparatus. A location evaluator checks whether the mobile terminal apparatus is located within a predetermined zone area according to the location information. A storage access device acquires association information of a relationship between the zone area and available data allowed to be read within the zone area by authorization, from a storage device. A cancellation signal generator generates a cancellation signal for instructing cancellation of the available data associated with the zone area in case the location evaluator judges that the mobile terminal apparatus is moved out of the zone area.

Preferably, the mobile terminal apparatus includes a canceller for canceling the available data upon receiving the cancellation signal.

In still another preferred embodiment, a data security method includes a step of acquiring location information of a current location of a mobile terminal apparatus. It is checked whether the mobile terminal apparatus is located within a predetermined zone area according to the location information. Association information of a relationship between the zone area and available data allowed to be read within the zone area by authorization is stored. A cancellation signal for instructing cancellation of the available data associated with the zone area is generated in case it is judged that the mobile terminal apparatus is moved out of the zone area.

In another preferred embodiment, a computer-executable program for data security includes an acquisition program code for acquiring location information of a current location of a mobile terminal apparatus. An evaluation program code is for checking whether the mobile terminal apparatus is located within a predetermined zone area according to the location information. An acquisition program code is for acquiring association information of a relationship between the zone area and available data allowed to be read within the zone area by authorization, from a storage device. A generation program code is for generating a cancellation signal for instructing cancellation of the available data associated with the zone area in case it is judged that the mobile terminal apparatus is moved out of the zone area.

Consequently, data can be read on a mobile terminal even with high confidentiality and information leakage can be prevented reliably, as a cancellation signal is utilized for available data in the case of the outside of a zone area.

BRIEF DESCRIPTION OF THE DRAWINGS

The above objects and advantages of the present invention will become more apparent from the following detailed description when read in connection with the accompanying drawings, in which:

FIG. 5 is a flowchart illustrating operation of the server apparatus or data security apparatus;

FIG. 6 is a flow chart illustrating operation of another preferred embodiment with automatic distribution;

DETAILED DESCRIPTION OF THE PREFERRED EMBODIMENT(S) OF THE PRESENT INVENTION

Figure 1:
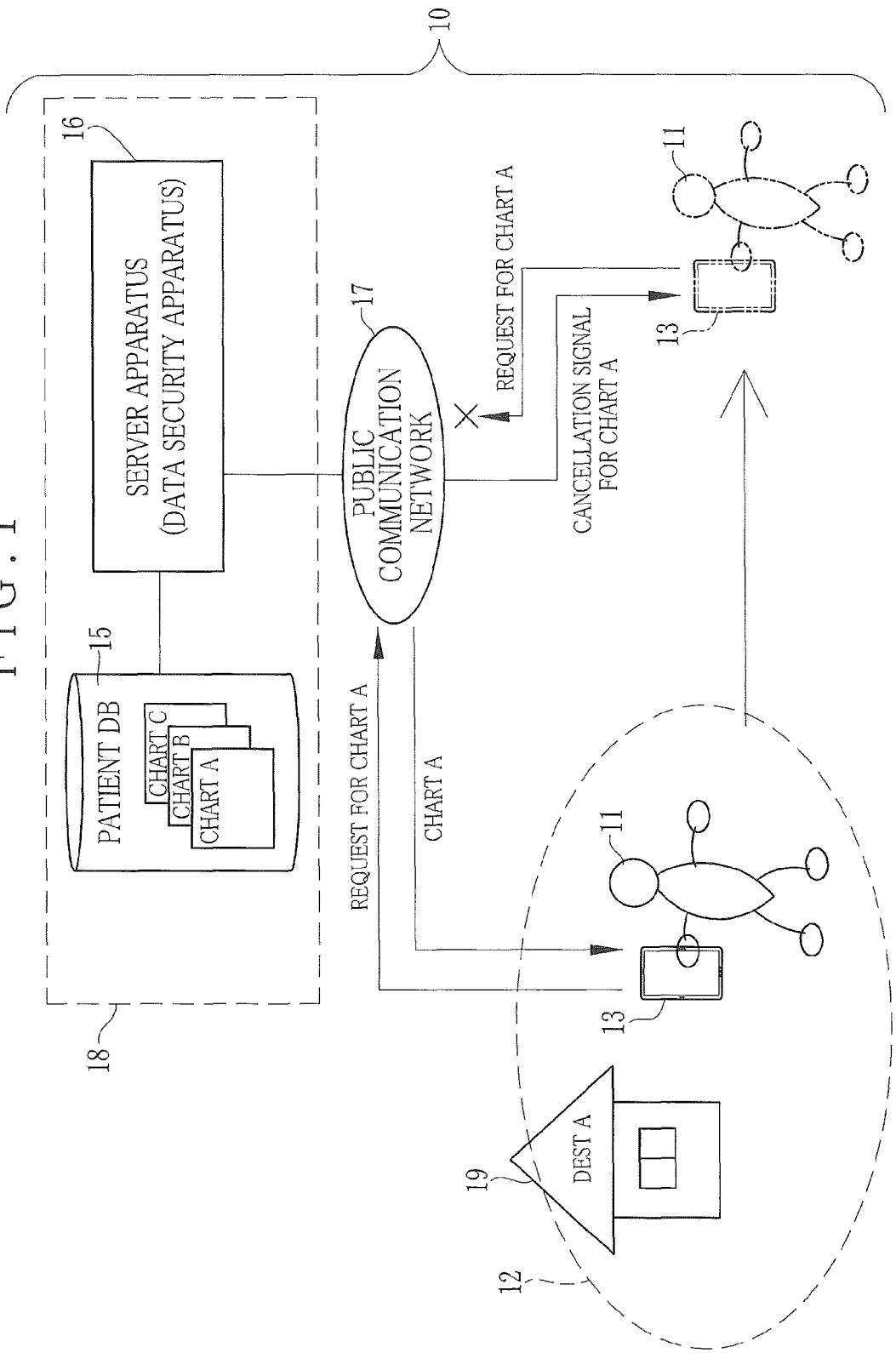
FIG. 1 is a block diagram schematically illustrating an information sharing system as data security system.

In FIG. 1, an information sharing system 10 as data security system includes a mobile terminal apparatus 13, and a server apparatus 16 or data security apparatus. The mobile terminal apparatus 13 is used by a user 11 such as a doctor, nurse or operator for diagnosis and treatment outside a medical facility such as a hospital facility, for example, for home care at a patient's home. There is a hospital facility 18 (medical service provider) or a site in which the server apparatus 16 is installed. A patient database storage 15 as patient database (DB) is connected with the server apparatus 16 communicably, and stores data of medical charts A, B and C including patient information and examination data for each of patients. The server apparatus 16 receives a request from the mobile terminal apparatus 13 for transmission through a public communication network 17, such as a mobile communication network, public telecommunication network, the Internet and the like. The server apparatus 16 transmits a medical chart from the patient database storage 15 to the mobile terminal apparatus 13, and receives uploaded data from the mobile terminal apparatus 13 to update the patient database storage 15. The user 11 is enabled to read the medical chart with the mobile terminal apparatus 13 even by external access, for example, at a patient's home.

The server apparatus 16 functions for preventing information leakage of medical charts due to incidental loss of the mobile terminal apparatus 13. To this end, the server apparatus 16 enables distribution of a medical chart only in case the mobile terminal apparatus 13 is located within a zone area (registered area) predetermined suitably. The server apparatus 16 transmits a cancellation signal to the mobile terminal apparatus 13 for deleting the medical chart assuming that the mobile terminal apparatus 13 is moved out of the zone area 12. The mobile terminal apparatus 13 in response to the cancellation signal deletes the medical chart from its storage. Also, the server apparatus 16 inhibits transmission of a medical chart in case the mobile terminal apparatus 13 is located outside the zone area 12 even assuming that a request is received from the mobile terminal apparatus 13.

In FIG. 1, the zone area 12 is predetermined at a patient location 19 or destination location as home of a patient A and inclusive of a limited range around the patient location 19. Only in case the mobile terminal apparatus 13 is located within the zone area 12, the server apparatus 16 enables transmission of information of a medical chart A of the patient A as available data to be managed by the security control.

Figure 2:
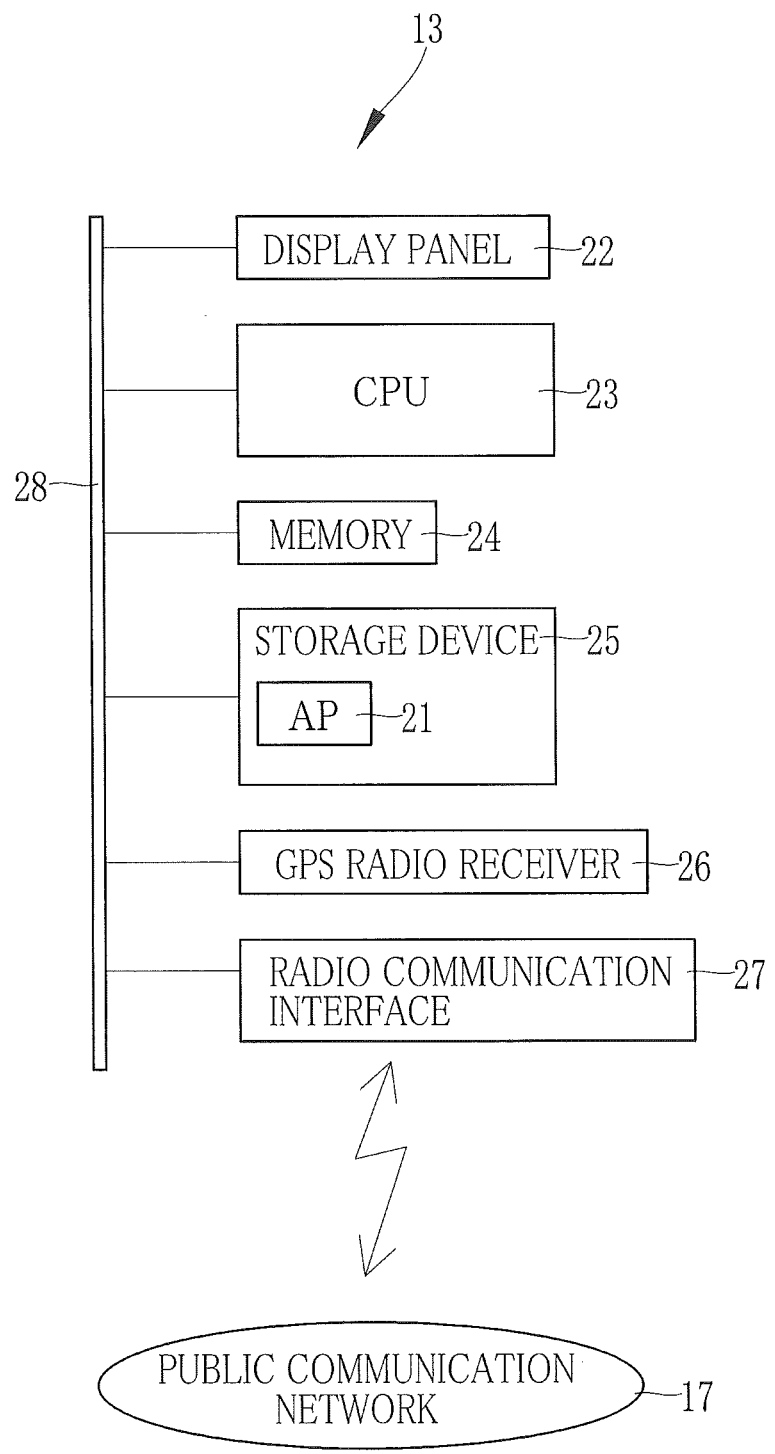
FIG. 2 is a block diagram schematically illustrating a mobile terminal apparatus.

In FIG. 2, an application program (AP) 21 is installed in a mobile communication apparatus to constitute the mobile terminal apparatus 13. Examples of the mobile communication apparatus are a cellular telephone, smart phone and the like. An operating system (OS) as a control program is installed in addition to the application program 21, for functioning the mobile terminal apparatus 13 in combination with the server apparatus 16 within the information sharing system 10 as data security system. The mobile terminal apparatus 13 includes a display panel 22, a CPU 23, a memory 24, a storage device 25, a GPS radio receiver as GPS communication device (global positioning system communication device), and a radio communication interface 27, which are interconnected by use of a data bus 28.

An example of the display panel 22 is a liquid crystal display panel with a touch panel structure. The display panel 22 displays data of a medical chart, and receives a manual input with a menu image. The storage device 25 stores various data. Examples of the storage device 25 are a hard disk drive (HDD), semiconductor memory and the like. The storage device 25 stores a control program and the application program 21 such as software for a console unit.

The memory 24 is a working memory with which the CPU 23 performs tasks. The CPU 23 loads the memory 24 with the control program read from the storage device 25, and functions according to the control program to control various elements in the mobile terminal apparatus 13.

The GPS radio receiver 26 communicates with a GPS satellite or a radio base station included in the public communication network 17, and acquires location information of the mobile terminal apparatus 13. The location information of the mobile terminal apparatus 13 is transmitted to the server apparatus 16. The radio communication interface 27 controls the communication with the server apparatus 16 through the public communication network 17.

Figure 3:
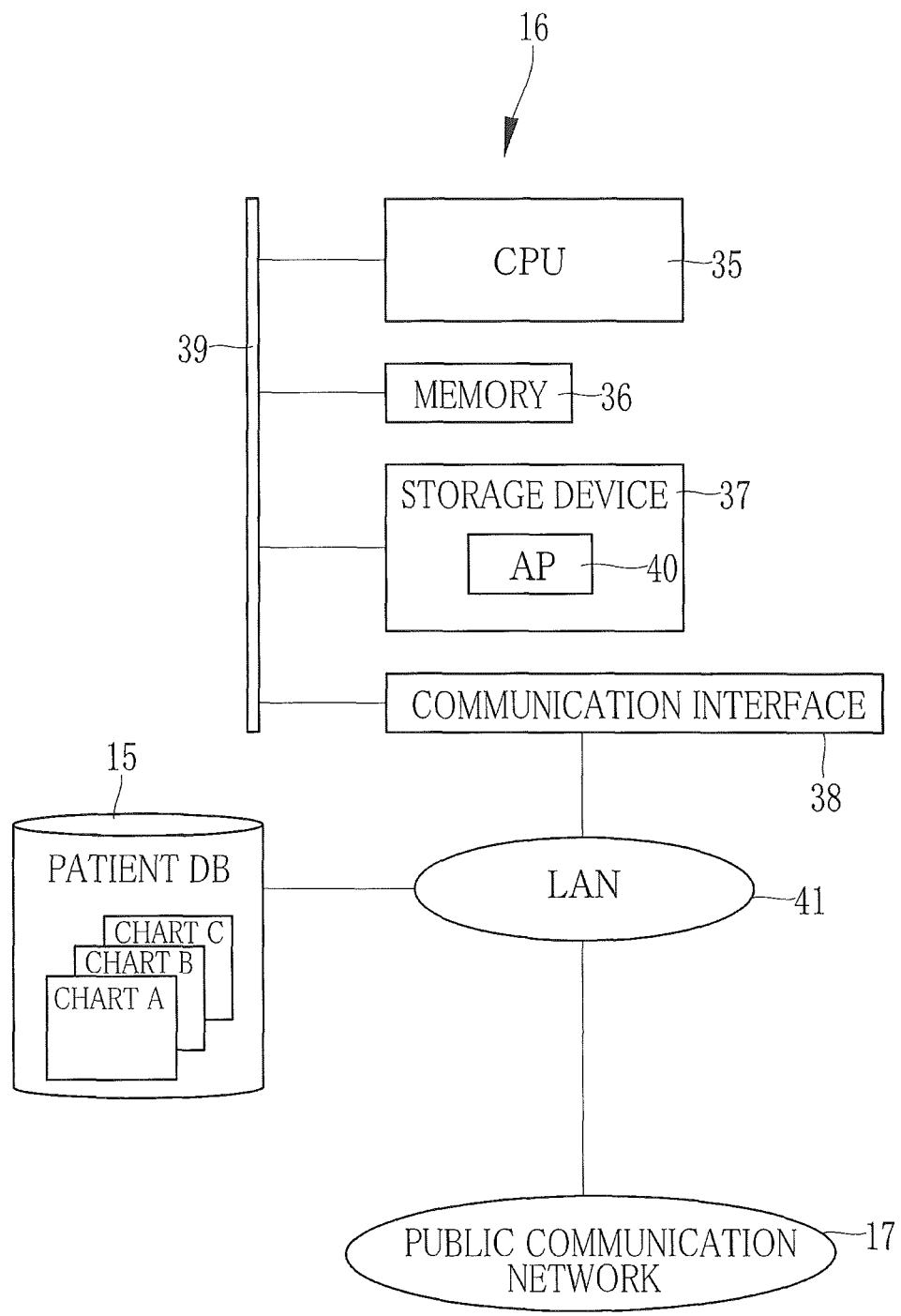
FIG. 3 is a block diagram schematically illustrating a server apparatus or data security apparatus.

In FIG. 3, an application program (AP) 40 is installed in a computer to constitute the server apparatus 16. Examples of the computer are a personal computer and a workstation. An operating system (OS) as a control program is installed in addition to the application program 40. The server apparatus 16 includes a CPU 35 (storage access device), a memory 36, a storage device 37 and a communication interface 38, which are interconnected by use of a data bus 39.

The storage device 37 stores various data and the application program 40. An example of the storage device 37 is a hard disk drive (HDD).

The memory 36 is a working memory with which the CPU 35 performs tasks. The CPU 35 loads the memory 36 with the application program 40 read from the storage device 37, and functions according to the control program to control various elements in the computer.

A local area network (LAN) 41 is installed in the hospital facility 18 for internal communication. The communication interface 38 is coupled with the LAN 41. The communication interface 38 communicates with the patient database storage 15 by means of the LAN 41. Also, the communication interface 38 communicates with the mobile terminal apparatus 13 by means of the LAN 41 and the public communication network 17.

Figure 4:
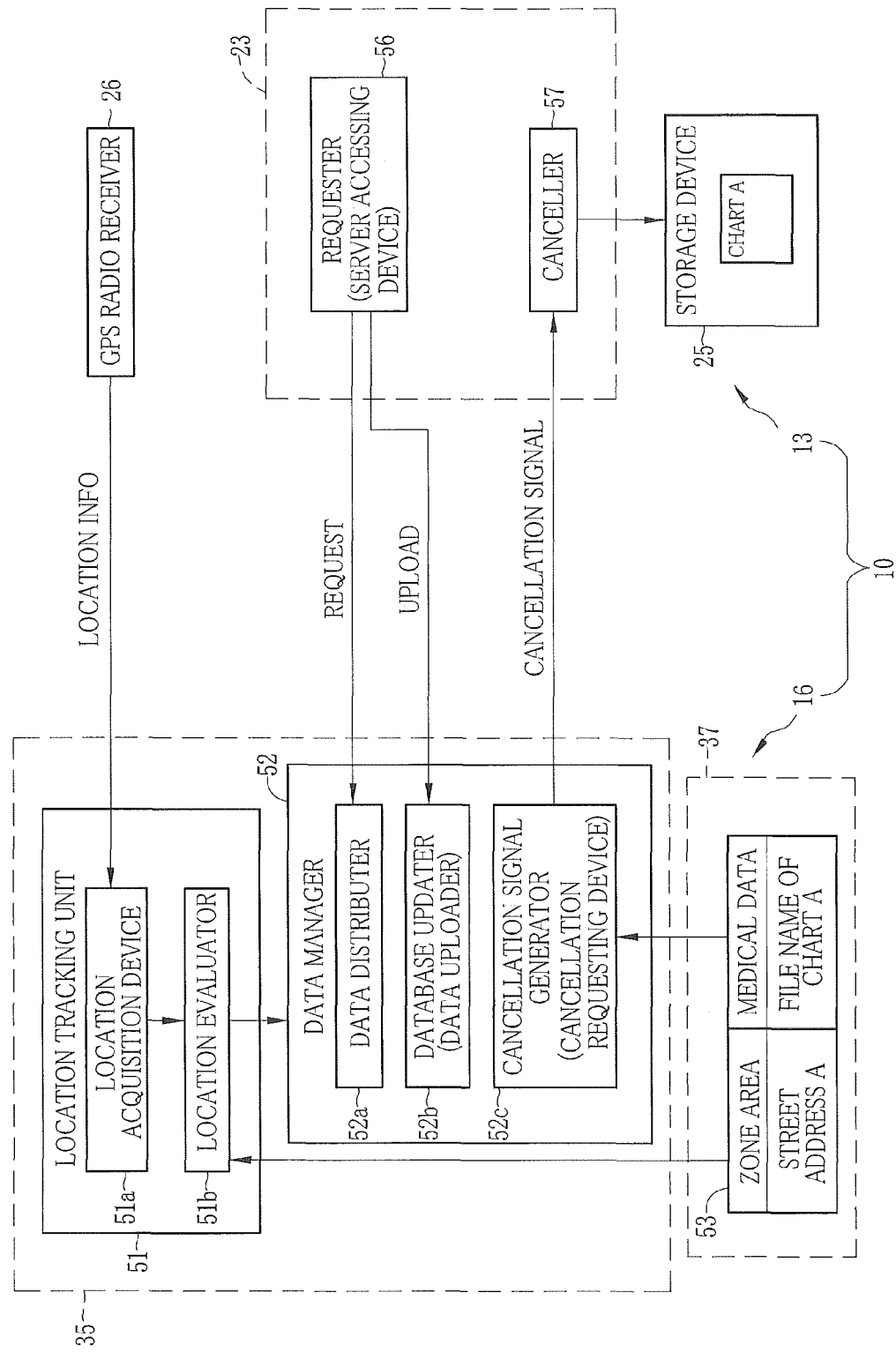
FIG. 4 is a block diagram schematically illustrating circuit elements of the information sharing system as data security system.

As the application program 40 in the CPU 35 of the server apparatus 16 is run, the CPU 35 comes to include a terminal location tracking unit 51 and a data manager 52. See FIG. 4. The location tracking unit 51 includes a current location acquisition device 51a and a location evaluator 51b. The location acquisition device 51a acquires location information of a current location from the mobile terminal apparatus 13. The location evaluator 51b operates according to the location information from the location acquisition device 51a, and checks whether the mobile terminal apparatus 13 is located within the zone area 12 or not. The location acquisition device 51a periodically acquires location information from the mobile terminal apparatus 13. The location evaluator 51b additionally detects movement of the mobile terminal apparatus 13 into and out of the zone area 12 according to the location information.

Also, assuming that the mobile terminal apparatus 13 is moved out of the zone area 12, the location evaluator 51b notifies the data manager 52 of the event of moving out.

The data manager 52 includes a data distributer 52a, a database updater 52b as data uploader, and a cancellation signal generator 52c (authorization processor) as cancellation requesting device. The data distributer 52a receives a request from the mobile terminal apparatus 13, and transmits or distributes data of a medical chart in the patient database storage 15 to the mobile terminal apparatus 13. The database updater 52b (data uploader) receives a request of uploading of data to the patient database storage 15 from the mobile terminal apparatus 13, and updates the patient database storage 15 according to the data of the uploaded medical chart. The cancellation signal generator 52c operates assuming that the location evaluator 51b detects that the mobile terminal apparatus 13 has been moved out of the zone area 12, and sends a cancellation signal to the mobile terminal apparatus 13 for canceling the available data according to the security control.

Association table data 53 as association information are stored by the storage device 37 for a relationship between the zone area 12 and available data, for example, data of a medical chart. The zone area 12 is defined at the patient location 19 with the patient A and in a predetermined range thereabout as a destination of the user 11. Data of the zone area 12 is in a form of GPS location information acquired according to a telephone number and street address of the patient location 19 with the patient A. The user 11 can read the medical chart A of the patient A with the mobile terminal apparatus 13 at his or her destination of travel, to satisfy purposes of diagnosis, treatment, nursing or home care. To this end, the association table data 53 are constituted by a combination of the zone area 12 for the destination of the user 11 and recognition information of the medical chart A of the patient A in relation to the zone area 12. An example of the recognition information is a file name of the medical chart A.

The data distributer 52a (storage access device) upon receiving a request from the mobile terminal apparatus 13 for data of the chart A refers to the association table data 53, and checks whether the requested data is registered in the association table data 53. Assuming that it is, then the data distributer 52a refers to the location evaluator 51b for the location information of the mobile terminal apparatus 13. Assuming that the mobile terminal apparatus 13 is located within the zone area 12, then the data distributer 52a is enabled to distribute the chart A to the mobile terminal apparatus 13. Assuming that the mobile terminal apparatus 13 is not located within the zone area 12, then the data distributer 52a is disabled from distributing the chart A.

In case the application program 21 is run, a requester 56 as server accessing device and a canceller 57 are ready to operate in the CPU 23 of the mobile terminal apparatus 13. The requester 56 accesses the server apparatus 16 to carry out a request of transmission and a request of uploading. The transmitted data are stored in the storage device 25. Specifically, the transmitted data include a medical image and the mobile terminal apparatus 13 is used at a patient's home. Examples of information of a request of uploading include key image information, annotation information and processing information. The key image information is relevant to a medical image selected as a key image. The annotation information is relevant to annotation. The processing information is relevant to processing to the medical image, for example, blackening. In the case of using the mobile terminal apparatus 13 for the home care, information of the request for uploading includes addition of a record of the home care to the transmitted data. According to the instruction for the cancellation from the server apparatus 16, the canceller 57 performs a task for canceling available data stored in the storage device 25.

The operation of the construction is described now by referring to a flow chart in FIG. 5. Before the user 11 with the mobile terminal apparatus 13 travels to the patient location 19 with the patient A, the association table data 53 are written to the storage device 37 (with the storage access device) in the server apparatus 16 previously at the hospital facility 18, the association table data 53 being a relationship between area information of the zone area 12 (registered area) around the patient location 19 with the patient A, and chart data of the medical chart A of the patient A as available data. Upon a start of the travel of the user 11 from the hospital facility 18, the server apparatus 16 starts up the application program 40 for the location tracking unit 51 to track the location information of the mobile terminal apparatus 13. See the step S101.

In the zone area 12, the user 11 downloads the medical chart A from the server apparatus 16 through the mobile terminal apparatus 13 to read this for the patient A. The mobile terminal apparatus 13 transmits a transmission request of the medical chart A to the server apparatus 16. The server apparatus 16 upon receiving the request from the mobile terminal apparatus 13 (yes in the step S102) checks whether the data of the medical chart A is available data and whether the mobile terminal apparatus 13 is located within the zone area 12 in the step S103 according to the association table data 53. Assuming that the mobile terminal apparatus 13 is not located within the zone area 12, the server apparatus 16 disables the transmission. Assuming that it is, the server apparatus 16 transmits the data of the medical chart A to the mobile terminal apparatus 13 in the step S104. Thus, the user 11 can read the medical chart A at the patient location 19 with the patient A as a destination.

The user 11, in the case of editing the medical chart A with a partially added portion at the mobile terminal apparatus 13, uploads the edited data of the medical chart A to the server apparatus 16. The server apparatus 16 updates the patient database storage 15 by storing the uploaded data of the medical chart A.

After the home care or diagnosis of the patient A is completed, the user 11 moves out of the zone area 12 to return to the hospital facility 18. The server apparatus 16 after transmitting the information of the medical chart A continues tracking the location of the mobile terminal apparatus 13 in the step S105. In case the mobile terminal apparatus 13 is moved out of the zone area 12, the server apparatus 16 transmits a cancellation signal to the mobile terminal apparatus 13 to cancel the medical chart A in the step S106. Upon receiving the cancellation signal, the mobile terminal apparatus 13 cancels or deletes the data of the medical chart A from the storage device 25. The same operation is repeated by the server apparatus 16 until completion of monitoring the location of the mobile terminal apparatus 13. Also, the server apparatus 16 inhibits distribution of the information of the medical chart A outside the zone area 12 even upon receiving a transmission request from the mobile terminal apparatus 13.

As described heretofore, it is possible in the use of the mobile terminal apparatus 13 outside the hospital facility 18 to prevent information leakage and to read medical charts at an external destination with the mobile terminal apparatus 13. The server apparatus 16 enables transmission and reading of the medical chart A within the zone area 12, and causes the mobile terminal apparatus 13 to delete the data of the medical chart upon movement of the mobile terminal apparatus 13 out of the zone area 12. Should the user 11 accidentally lose the mobile terminal apparatus 13 outside the zone area 12, an unknown person having picking up the mobile terminal apparatus 13 cannot read the medical chart, because no data of the medical chart remains in the mobile terminal apparatus 13. Also, distribution of medical charts to the mobile terminal apparatus 13 is disabled outside the zone area 12. It is impossible for a third party to read the medical chart with the mobile terminal apparatus 13.

In FIG. 6, a second preferred embodiment is illustrated. Unlike the first embodiment in which the medical chart A is transmitted in response to the request from the mobile terminal apparatus 13, the medical chart A in FIG. 6 is automatically transmitted in response to entry of the mobile terminal apparatus 13 to the zone area 12 from the outside. See the step S202. The steps S101 and S104-S107 of FIG. 5 are repeated in the steps S201 and S203-S206 in the flow chart of FIG. 6.

Figure 7A:
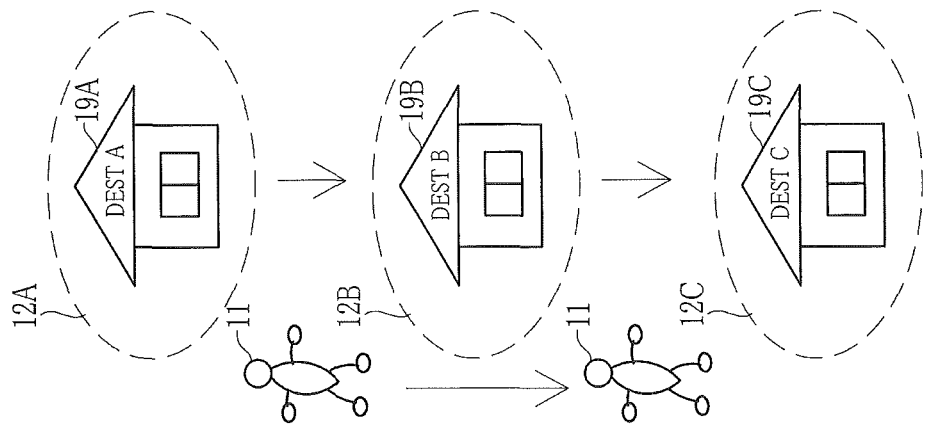
FIG. 7A is a block diagram schematically illustrating circuit elements instill another preferred embodiment in use of schedule information.
Figure 7B:
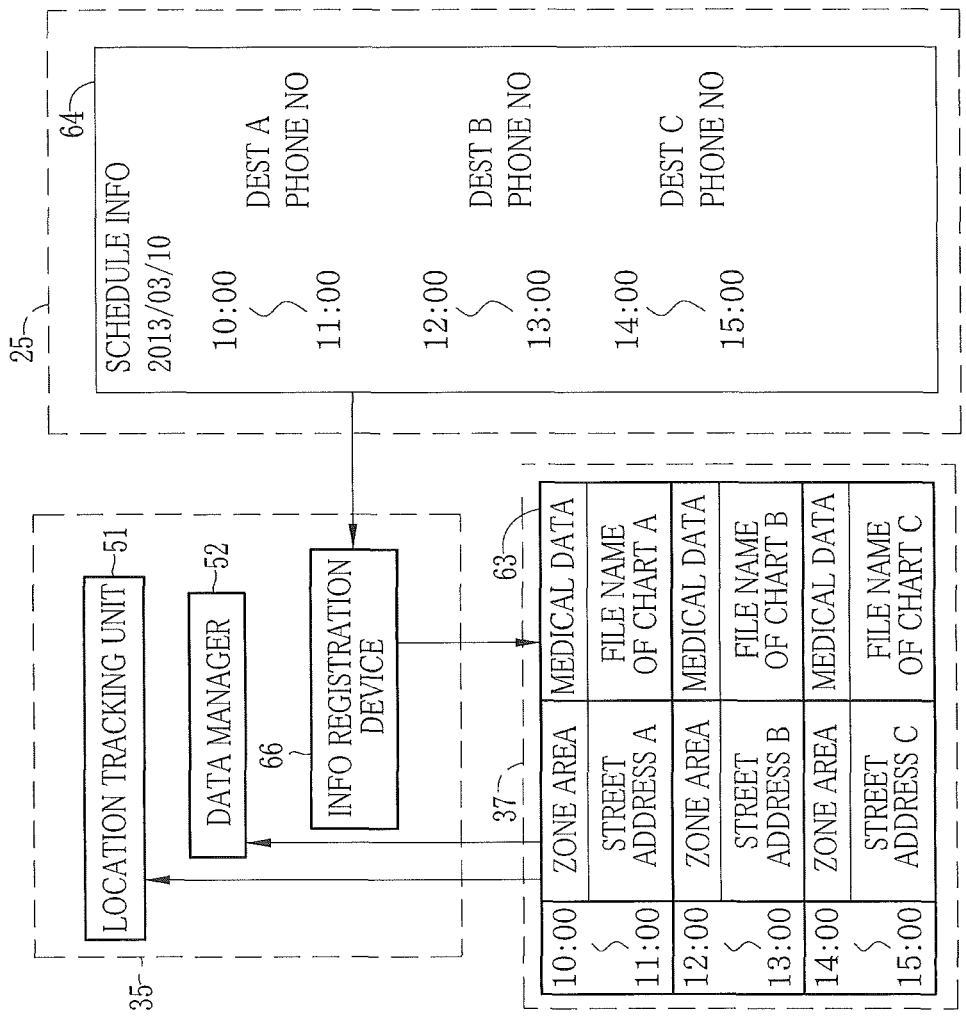
FIG. 7B is an explanatory view illustrating a travel of a user between patient locations.

In a third preferred embodiment, association table data 63 as association information are stored and used for plural combinations of zone areas and available data. In FIGS. 7A and 7B, the user 11 travels to patient locations 19A, 19B and 19C or destination locations as homes of patients A, B and C. Three zone areas 12A, 12B and 12C are registered, to form available data, such as medical charts A, B and C. The association table data 63 are combinations between information of destinations of the user 11 and the medical charts A, B and C. Also, time data are registered with the association table data 63 for a scheduled visit to each of the destination locations, such as 10:00-11:00 for the patient location 19A with the patient A, 13:00-14:00 for the patient location 19B with the patient B, and 15:00-16:00 for the patient location 19C with the patient C.

The association table data 63 may be registered manually with the server apparatus 16. However, manual operation for registration is laborious in case of a very great amount of the association table data 63. In view of this problem, an information registration device 66 is incorporated in the server apparatus 16, acquires schedule information 64 of a planned travel of the user 11 registered in the mobile terminal apparatus 13, and writes the association table data 63 to the storage device according to the schedule information 64. In case the application program 40 is run, the information registration device 66 is ready to operate in the CPU 35.

The schedule information 64 is input to the mobile terminal apparatus 13 by the user 11. Portions of the schedule information 64 include information of names and telephone numbers of patients as destination information. Also, information of dates of the travel is registered with the schedule information 64. The user 11 uploads the schedule information 64 in the mobile terminal apparatus 13. Upon acquiring the schedule information 64, the information registration device 66 specifies GPS location information from one of the telephone numbers of a patient, and designates the medical chart A according to the patient name. Thus, the association table data 63 are created and written to the storage device 37.

In case the user 11 carries the mobile terminal apparatus 13 and travels to various destinations according to the schedule, the server apparatus 16 tracks the location of the mobile terminal apparatus 13. In case the mobile terminal apparatus 13 enters the zone area 12A containing the patient location 19A with the patient A, the server apparatus 16 transmits data of the medical chart A to the mobile terminal apparatus 13. In case the mobile terminal apparatus 13 is moved out of the zone area 12A, the server apparatus 16 sends a cancellation signal for the medical chart A. Similarly, in case the mobile terminal apparatus 13 enters the zone area 12B, the server apparatus 16 transmits data of the medical chart B to the mobile terminal apparatus 13. In case the mobile terminal apparatus 13 is moved out of the zone area 12B, the server apparatus 16 sends a cancellation signal for the medical chart B. Similar control is performed for the zone area 12C and the medical chart C. Note that the third embodiment can be also combined with the first embodiment. In short, data of a medical chart can be transmitted in response to a request from the mobile terminal apparatus 13.

Also, it is possible for the server apparatus 16 to transmit a cancellation signal to the mobile terminal apparatus 13 after a scheduled time period of the scheduled visit determined in the planned travel even in the presence of the mobile terminal apparatus 13 in the zone area. For example, the mobile terminal apparatus 13 is located in the zone area 12A. The medical chart A is received. In case the scheduled time period of the scheduled visit of the mobile terminal apparatus 13 to the patient location 19A with the patient A has passed, the cancellation signal is transmitted even in the presence of the mobile terminal apparatus 13 in the zone area 12A. Accordingly, the security control or data protection can be carried out strictly by minimizing the duration of keeping the data of the chart in the mobile terminal apparatus 13. Furthermore, it is possible only to use the information of the destination location for the purpose of data management without information of a schedule of travel.

In the above embodiments, the medical data as available data are medical chart data. However, other medical data can be treated, for example, diagnostic data of a result of diagnosis of a patient. Examples of diagnostic data include value data of blood examination and the like, image data of medical imaging, and the like.

In the above embodiments, the available data are a document file of the medical chart. File formats of the available data according to the invention can be a word processing document, text file, spreadsheet file, image file and the like.

In the above embodiments, the information sharing system 10 as data security system is applied for the use outside the hospital facility 18, for example, for the home care. However, the information sharing system 10 can be used inside the hospital facility 18. For example, patient locations in the information sharing system 10 can be numerous locations of patients in a hospital facility. The zone area 12 can be numerous hospital rooms, between which the user 11, doctor or nurse travels for diagnosis or treatment. Available data are data required for the purpose. Although safety in the data in the hospital facility 18 can be satisfied more easily than the outside of the hospital facility 18, improper access to the data may occur incidentally with an unauthorized third party. The feature of the present invention is advantageous in the utilization in the hospital facility 18.

Note that the storage device 37 is incorporated in the server apparatus 16. However, the association table data 53 can be stored in a removable storage medium coupled with the server apparatus 16, for example, flexible disk, CD, memory stick and the like.

In the above embodiments, the zone areas 12 and 12A-12C are geographic areas defined on a map with borderlines. However, the zone areas 12 and 12A-12C can be formed in a shape of circle, quadrilateral or the like defined geometrically with reference to a destination location.

In the above embodiment, the cancellation of the available data is instructed. However, security control of other methods for available data can be used. For example, the available data in the mobile terminal apparatus 13 is processed in protection processing in response to receiving the cancellation signal from the server apparatus 16, so that the protection is not releasable in the mobile terminal apparatus 13. The available data can be set in an unreadable form. In case the mobile terminal apparatus 13 is moved again into the zone area 12, the server apparatus 16 transmits an authorization signal to unprotect the available data, so as to render the available data readable.

Also, the information sharing system 10 as data security system can be used in a field other than the medical field, for example, for a business purpose. The mobile terminal apparatus 13 can be carried by a salesperson of a company, to travel between locations of customers. Available data in the field of the business is customer data, sales data and the like in place of medical data. Those are data of high confidentiality because of privacy of the various customers and trade secret. The information sharing system 10 as data security system can be utilized effectively to prevent information leakage or misappropriation of those data.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A data security apparatus comprising:
   a location acquisition device for acquiring location information of a current location of a mobile terminal apparatus;
   a location evaluator for checking whether said mobile terminal apparatus is located within a predetermined zone area according to said location information;
   a storage access device for acquiring association information of a relationship between said zone area and available data allowed to be read within said zone area by authorization, from a storage device;
   a cancellation signal generator for generating a cancellation signal for instructing cancellation of said available data associated with said zone area in case said location evaluator judges that said mobile terminal apparatus is moved out of said zone area; and
   an information registration device for acquiring schedule information of a planned travel of a user with said mobile terminal apparatus, and registering said association information according to said schedule information.

2. A data security apparatus as defined in claim 1, further comprising:
   a data distributer for transmitting said available data to said mobile terminal apparatus;
   a data manager for enabling transmission of said data distributer in case said location evaluator detects that said mobile terminal apparatus is located within said zone area, and disabling transmission of said data distributer in case said location evaluator detects that said mobile terminal apparatus is located outside said zone area.

3. A data security apparatus as defined in claim 2, wherein in case said location evaluator judges that said mobile terminal apparatus has entered said zone area, said data distributer starts transmitting said available data.

4. A data security apparatus as defined in claim 1, further comprising a data uploader for uploading said available data upon a request from said mobile terminal apparatus in case said available data is changed in said mobile terminal apparatus.

5. A data security apparatus as defined in claim 1,
   wherein said schedule information includes data of said zone area and data of a scheduled time period of a scheduled visit of said user associated with said zone area; and
   upon passage of said scheduled time period, said cancellation signal generator generates said cancellation signal for said available data corresponding to said zone area.

6. A data security apparatus as defined in claim 1, wherein said zone area is defined with reference to a predetermined destination location of a travel of a user carrying said mobile terminal apparatus.

7. A data security apparatus as defined in claim 1, wherein said location information comprises GPS information.

8. A data security apparatus as defined in claim 1, wherein said available data comprises medical data.

9. A data security apparatus as defined in claim 8, wherein said medical data comprises data of a medical chart.

10. A data security system including a mobile terminal apparatus, and a server apparatus, connected with said mobile terminal apparatus by communication network connection, for transmitting available data to said mobile terminal apparatus, said data security system comprising:

a location acquisition device for acquiring location information of a current location of said mobile terminal apparatus;

a location evaluator for checking whether said mobile terminal apparatus is located within a predetermined zone area according to said location information;

a storage access device for acquiring association information of a relationship between said zone area and available data allowed to be read within said zone area by authorization, from a storage device;

a cancellation signal generator for generating a cancellation signal for instructing cancellation of said available data associated with said zone area in case said location evaluator judges that said mobile terminal apparatus is moved out of said zone area; and an information registration device for acquiring schedule information of a planned travel of a user with said mobile terminal apparatus, and registering said association information according to said schedule information.

\* \* \* \* \*